(12) United States Patent　(10) Patent No.: US 12,124,605 B2
Nakagawa et al.　(45) Date of Patent: Oct. 22, 2024

(54) MANAGEMENT APPARATUS, MANAGEMENT METHOD, VERIFICATION APPARATUS, COMPUTER PROGRAM AND RECORDING MEDIUM

(71) Applicant: NEC Corporation, Tokyo (JP)

(72) Inventors: Sanami Nakagawa, Tokyo (JP); Keisuke Kajigaya, Tokyo (JP); Takao Takenouchi, Tokyo (JP); Batnyam Enkhtaivan, Tokyo (JP)

(73) Assignee: NEC CORPORATION, Tokyo (JP)

( * ) Notice: Subject to any disclaimer, the term of this patent is extended or adjusted under 35 U.S.C. 154(b) by 335 days.

(21) Appl. No.: 17/612,741

(22) PCT Filed: May 29, 2019

(86) PCT No.: PCT/JP2019/021278
§ 371 (c)(1),
(2) Date: Nov. 19, 2021

(87) PCT Pub. No.: WO2020/240729
PCT Pub. Date: Dec. 3, 2020

(65) Prior Publication Data
US 2022/0237320 A1　Jul. 28, 2022

(51) Int. Cl.
*G06F 21/62*　(2013.01)
*G06F 21/60*　(2013.01)
(Continued)

(52) U.S. Cl.
CPC ........ *G06F 21/6245* (2013.01); *G06F 21/602* (2013.01); *G06F 21/64* (2013.01); *H04L 9/50* (2022.05); *G06F 2221/2141* (2013.01)

(58) Field of Classification Search
CPC .... G06F 21/602; G06F 21/6245; G06F 21/64; G06F 2221/2141; H04L 9/50
See application file for complete search history.

(56) References Cited

U.S. PATENT DOCUMENTS

| 2009/0271842 A1* | 10/2009 | Baumhof | H04L 63/1483 726/1 |
| 2011/0145598 A1 | 6/2011 | Smith et al. | |

(Continued)

FOREIGN PATENT DOCUMENTS

| JP | 2002-123633 A | 4/2002 |
| JP | 2011-022826 A | 2/2011 |

(Continued)

OTHER PUBLICATIONS

International Search Report for PCT Application No. PCT/JP2019/021278, mailed on Aug. 20, 2019.

*Primary Examiner* — Gil H. Lee (57) ABSTRACT

A management apparatus is operated by one operating entity. The management apparatus includes: a storage unit that stores a policy information, which is associated with data provided by a data provider to another operating entity that is different from the one operating entity, and which defines a provision permission policy of the data provider for the data; an acquisition unit that refers to a log information in which a first hash value of one policy information is recorded and that obtains a policy information corresponding to the one policy information from the storage unit, the one policy information being associated with one data provided to a data user from the another operating entity; and a comparison unit that calculates a second hash value of the obtained policy information and that compares it with the first hash value.

5 Claims, 4 Drawing Sheets

(51) Int. Cl.
*G06F 21/64* (2013.01)
*H04L 9/00* (2022.01)

(56) References Cited

U.S. PATENT DOCUMENTS

| | | | |
|---|---|---|---|
| 2013/0139217 A1* | 5/2013 | Xie | H04L 63/0281 |
| | | | 726/1 |
| 2017/0132625 A1 | 5/2017 | Kennedy | |
| 2018/0260212 A1 | 9/2018 | Wisnovsky | |
| 2019/0130122 A1* | 5/2019 | Barnes | G06F 21/602 |
| 2023/0177021 A1* | 6/2023 | Earley | H04L 9/50 |
| | | | 707/827 |

FOREIGN PATENT DOCUMENTS

| | | | |
|---|---|---|---|
| JP | 2012-531000 A | 12/2012 | |
| JP | 2018-152050 A | 9/2018 | |
| JP | 2018-196097 A | 12/2018 | |
| JP | 2019-500675 A | 1/2019 | |

\* cited by examiner

MANAGEMENT APPARATUS, MANAGEMENT METHOD, VERIFICATION APPARATUS, COMPUTER PROGRAM AND RECORDING MEDIUM

This application is a National Stage Entry of PCT/JP2019/021278 filed on May 29, 2019, the contents of all of which are incorporated herein by reference, in their entirety.

TECHNICAL FIELD

The present invention relates to a management apparatus, a management method, a computer program, and a recording medium, and, in particular, to a management apparatus, a management method, a verification apparatus, a computer program, and a recording medium that are associated with an information service, such as, for example, a service that provides personal information.

BACKGROUND ART

As a technique used in this type of system or service, for example, there is a technique related to a blockchain described in Patent Literatures 1 to 3.

CITATION LIST

Patent Literature

Patent Literature 1: JP 2019-500675A
Patent Literature 2: JP 2018-152050A
Patent Literature 3: JP 2012-531000A

SUMMARY OF INVENTION

Technical Problem

There is an increasing number of business model services, such as an AI (Artificial Intelligence) and a data mining, that collects data to provide services that match individuals. However, there are growing concerns over services that utilize the data that is collected from an individual, such as GAFA (Google (registered trademark), Apple (registered trademark), Facebook (registered trademark), Amazon (registered trademark)), without the individual's knowledge. For this reason, data provision led by individuals is drawing attention. As a service to realize the data provision led by individuals, for example, a data provision service that implements an information bank service and a PDS (Personal Data Store) function has been proposed.

In the service involving the data provision led by individuals, a decision to permit the data provision is made by the individual that provides the data. On the other hand, it is difficult for the individual to confirm each of requests from users who wish to use the data and to decide whether or not to permit the data provision. Therefore, for example, the information bank service and the PDS function often provide the data to the above-described users, as a mediator, instead of the individual, in accordance with the provision permission policy of the individual. However, each individual's confidence in the mediator may change over time.

It is conceivable that the mediator would secure the transparency of information disclosure and the prevention of interpolation with a provision history, for example, by registering a data provision history in an open-type blockchain, and would try to gain each individual's confidence. Here, it is difficult to register the provision permission policy itself in the blockchain as a part of the provision history, because the permission policy on the data provision may fall under the personal information. Then, even if the provision history is registered in the blockchain, it is extremely difficult to verify whether or not the data provision is performed in accordance with the provision permission policy, which is technically problematic.

In view of the above-described problems, it is therefore an example object of the present invention to provide a management apparatus, a management method, a verification apparatus, a computer program, and a recording medium that are configured to verify whether or not the data provision is performed in accordance with the provision permission policy.

Solution to Problem

A management apparatus according to an example aspect of the present invention is a management apparatus operated by one operating entity, the management apparatus including: a storage unit that stores a policy information, which is associated with data provided by a data provider to another operating entity that is different from the one operating entity, and which defines a provision permission policy of the data provider for the data; an acquisition unit that refers to a log information in which a first hash value of one policy information is recorded and that obtains a policy information corresponding to the one policy information from the storage unit, the one policy information being associated with one data provided to a data user from the another operating entity; and a comparison unit that calculates a second hash value of the obtained policy information and that compares it with the first hash value.

A management apparatus according to another example aspect of the present invention is a management apparatus operated by one operating entity, the management apparatus including: a storage unit that stores a policy information, which is associated with data provided by a data provider to another operating entity that is different from the one operating entity, and which defines a provision permission policy of the data provider for the data; an acquisition unit that refers to an identification information that indicates one policy information associated with one data provided to the data user from the another operating entity, the acquisition unit obtaining a policy information corresponding to the one policy information from the storage unit; and a comparison unit that compares a second hash value calculated from the obtained policy information with a first hash value of the one policy information obtained from the another operating entity.

A management method according to an example aspect of the present invention is a management method in a management apparatus operated by one operating entity, the management method including: storing a policy information, which is associated with data provided by a data provider to another operating entity that is different from the one operating entity, and which defines a provision permission policy of the data provider for the data, into a storage unit; referring to a log information in which a first hash value of one policy information is recorded and obtaining a policy information corresponding to the one policy information from the storage unit, the one policy information being associated with one data provided to a data user from the another operating entity; and calculating a second hash value of the obtained policy information and comparing it with the first hash value.

A verification apparatus according to an example aspect of the present invention includes: an acquisition unit that refers to a log information in which a first hash value of one policy information is recorded and that obtains a policy information corresponding to the one policy information, the one policy information being associated with one data provided to a data user, the one policy information defining a provision permission policy for the one data of a data provider that provides the one data; and a comparison unit that calculates a second hash value of the obtained policy information and that compares it with the first hash value.

A computer program according to an example aspect of the present invention allows a computer to perform the management method according to the example aspect described above.

A recording medium according to an example aspect of the present invention is a recording medium on which the computer program according to the example aspect described above is recorded.

Advantageous Effects of Invention

According to the management apparatus in the one aspect and the other aspect described above, and the management method, the verification apparatus, the computer program, and the recording medium in the respective example aspects described above, it is possible to verify whether or not the provision of information is performed in accordance with the provision permission policy.

DESCRIPTION OF EXAMPLE EMBODIMENTS

A management apparatus, a management method, a verification apparatus, a computer program, and a recording medium according to example embodiments will be described with reference to the drawings. The following describes the management apparatus, the management method, the verification apparatus, the computer program, and the recording medium according to the example embodiments, by using a data distribution system 1 that distributes data, such as, for example, personal information.

First Example Embodiment

The data distribution system 1 according to the first example embodiment will be described with reference to FIG. 1 to FIG. 6.

(Overview of Data Distribution System)

Figure 1:
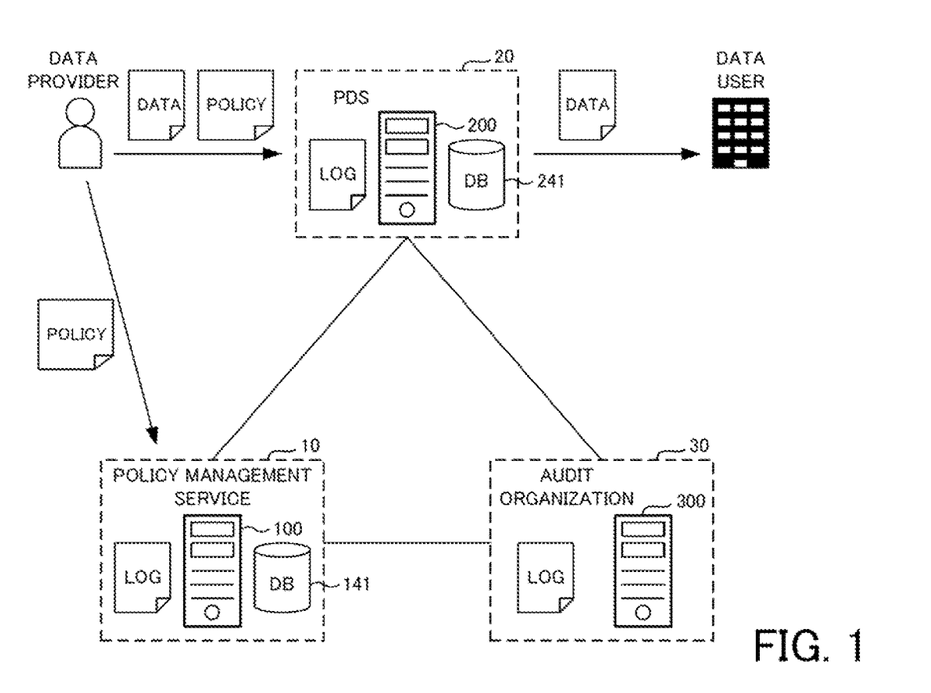
FIG. 1 is a diagram illustrating an overview of a data distribution system according to a first example embodiment.
Figure 2A:
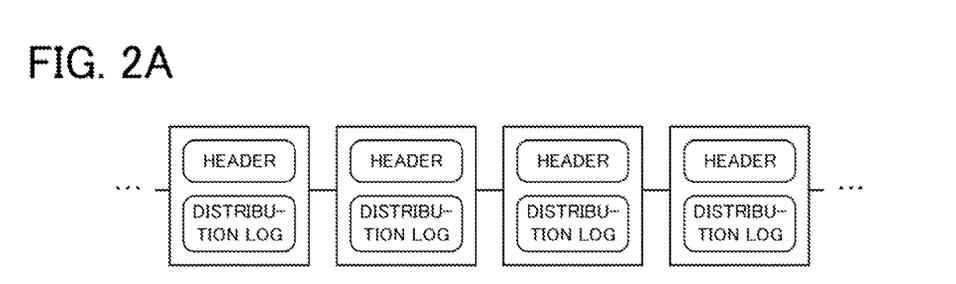
FIG. 2A and FIG. 2B are conceptual diagrams illustrating a concept of a data distribution log according to the first example embodiment.
Figure 2B:
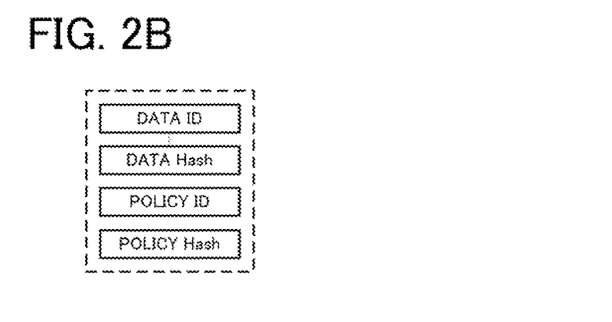

The overview of the data distribution system 1 according to the first example embodiment will be described with reference to FIG. 1, FIG. 2A and FIG. 2B. FIG. 1 is a diagram illustrating an overview of the data distribution system according to the first example embodiment. FIG. 2 is a conceptual diagram illustrating a concept of a data distribution log according to the first example embodiment.

In FIG. 1, the data distribution system 1 includes a policy management service 10, a PDS 20, and an audit organization 30. Here, the policy management service 10, the PDS 20, and the audit organization 30 are operated by respective different operating entities.

The policy management service 10 includes a policy management apparatus 100. The PDS 20 includes a data management apparatus 200. The audit organization 30 includes an audit apparatus 300. In addition, the policy management service 10 may include a plurality of policy management apparatuses 100. The PDS 20 may include a plurality of data management apparatus 200. The audit organization 30 may include a plurality of audit apparatuses 300.

The policy management apparatus 100, the data management apparatus 200, and the audit apparatus 300 are connected to each other through a network. Here, when a distributed network such as a Peer-to-Peer (P2P) network is employed as the network, the policy management apparatus 100, the data management apparatus 200, and the audit apparatus 300 may or may not function as nodes of the distributed network.

The data management apparatus 200 of the PDS 20 obtains data and a policy information that defines a data provider's provision permission policy for the data, from the data provider (e.g., an individual, a business operator that provides data about an individual, etc.), and stores the obtained data and policy information in a database 241 in association with each other. Here, the policy information is, for example, the information that defines a policy on whether or not to permit data provision when the PDS 20 (or, for example, an organization such as an information bank service) provides the data, and is mainly determined by the data provider itself. Specific examples of the policy (provision permission policy) include the purpose, period, and destination of use of data to be permitted. In addition, there may be a policy that indicates the rejection of the data provision to a specific company (e.g., a company that has caused information leakage, etc.). Incidentally, the data obtained from the data provider is not limited to the personal information, but may be various data, such as, for example, anonymously processed information.

The policy management apparatus 100 of the policy management service 10 obtains the policy information (that is, the same policy information as that stored in the database 241 of the PDS 20) from the data provider, and stores it in a database 141. Here, when a change is made to one policy information stored in the database 141 (that is, when one policy information is updated), the database 141 stores the one policy information before the change and one policy information after the change.

The data management apparatus 200 of the PDS 20 provides a data user with the data associated with the policy information, on the basis of the policy information stored in the database 241, when a request for data provision is received from the data user (typically, a business operator). Incidentally, the business operator as the data users includes, for example, pharmaceutical companies that use medical information for research purposes, retailers that use purchase information or the like for marketing, and the like.

When the data is provided from the PDS 20 to the data user, a log information associated with the data provision (hereinafter referred to as a "distribution log" as occasion demands) is generated. This distribution log is registered in a blockchain, which is an example of a data management ledger using a distributed ledger technique that is interpolation-resistant and that can be checked by the data provider. The blockchain with the distribution log registered is managed by each of the policy management apparatus 100 of the policy management service 10, the data management apparatus 200 of the PDS 20, and the audit apparatus 300 of the audit organization 30. Consequently, each of the policy management service 10, the PDS 20, and the audit organization 30 have the blockchain with the distribution log registered (see the "LOG" icon in FIG. 1).

For each block of the blockchain with the distribution log registered, as illustrated in FIG. 2A, for example, a header, one or a plurality of distribution logs, and the like are registered. As illustrated in FIG. 2B, each distribution log contains, for example, a data ID of the data provided to the data user, a hash value (data Hash) calculated by using the content of the data as an input value, a policy ID of the policy information associated with the data, and a hash value (policy Hash) calculated by using the content of the policy information as an input value. Incidentally, the distribution log may contain not only the information described above, but also other information, such as, for example, identification information that indicates the PDS 20. In addition, various existing aspects can be applied to a method of determining the hash value.

The policy management apparatus 100 of the policy management service 10 refers to the blockchain with the distribution log registered, and verifies whether or not the data is provided from the PDS 20 to the data user in accordance with the provision permission policy defined by the policy information (Note that this verification is different from the verification of each block of the blockchain). Similarly, the audit apparatus 300 of the audit organization 30 receives the policy information from the policy management service 10, refers to the blockchain with the distribution log registered, and verifies whether or not the data is provided from the PDS 20 to the data user in accordance with the provision permission policy defined by the policy information.

(Policy Management Apparatus)

Figure 3:
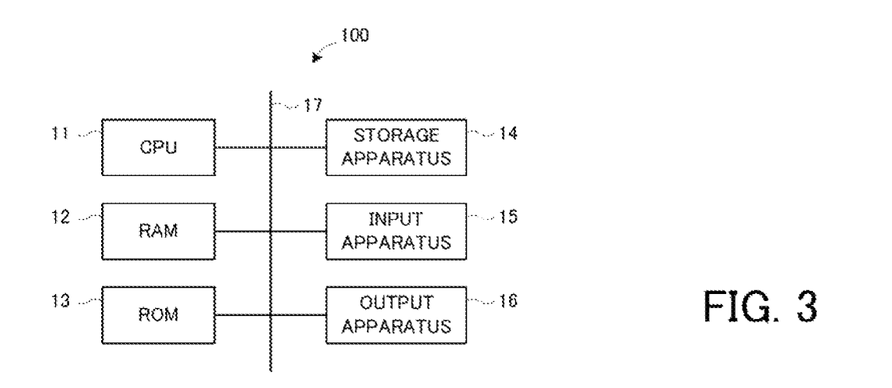
FIG. 3 is a block diagram illustrating a hardware configuration of a policy management apparatus according to the first example embodiment.

A hardware configuration of the policy management apparatus 100 of the policy management service 10 will be described with reference to FIG. 3. FIG. 3 is a block diagram illustrating a hardware configuration of the policy management apparatus 100 according to the first example embodiment. When a plurality of policy management apparatuses 100 are installed in the policy management service 10, all of the plurality of policy management apparatuses 100 may have the hardware configuration illustrated in FIG. 3.

In FIG. 3, the policy management apparatus 100 includes a CPU (Central Processing Unit) 11, a RAM (Random Access Memory) 12, a ROM (Read Only Memory) 13, a storage apparatus 14, an input apparatus 15, and an output apparatus 16. The CPU 11, the RAM 12, the ROM 13, the storage apparatus 14, the input apparatus 15, and the output apparatus 16 are interconnected through a data bus 17. The policy management apparatus 100 may be constructed as a cloud system. In this case, the input apparatus 15 and the output apparatus 16 may take a configuration corresponding to the cloud system.

The CPU 11 reads a computer program. For example, the CPU 11 may read a computer program stored by at least one of the RAM 12, the ROM 13 and the storage apparatus 14. For example, the CPU 11 may read a computer program stored in a computer-readable recording medium, by using a not-illustrated recording medium reading apparatus. The CPU 11 may obtain (i.e., read) a computer program from a not-illustrated apparatus disposed outside the policy management apparatus 100, through a network interface. The CPU 11 controls the RAM 12, the storage apparatus 14, the input apparatus 15, and the output apparatus 16 by executing the read computer program. Especially in the first example embodiment, when the CPU 11 executes the read computer program, a logical functional block(s) for verifying whether or not the data is provided from the PDS 20 to the data user in accordance with the provision permission policy defined by the policy information is implemented in the CPU 11. In other words, the CPU 11 is configured to function as a controller for performing the above-described verification. A configuration of the functional block implemented in the CPU 11 will be described in detail later with reference to FIG. 4.

The RAM 12 temporarily stores the computer program to be executed by the CPU 11. The RAM 12 temporarily stores the data that is temporarily used by the CPU 11 when the CPU 11 executes the computer program. The RAM 12 may be, for example, a D-RAM (Dynamic RAM).

The ROM 13 stores the computer program to be executed by the CPU 11. The ROM 13 may otherwise store fixed data. The ROM 13 may be, for example, a P-ROM (Programmable ROM).

The storage apparatus 14 stores the data that is stored for a long term by the policy management apparatus 100. The storage apparatus 14 may operate as a temporary storage apparatus of the CPU 11. The storage apparatus 14 may include, for example, at least one of a hard disk apparatus, a magneto-optical disk apparatus, an SSD (Solid State Drive), and a disk array apparatus.

The input apparatus 15 is an apparatus that receives an input instruction from a user of the policy management apparatus 100. The input apparatus 15 may include, for example, at least one of a keyboard, a mouse, and a touch panel.

The output apparatus 16 is an apparatus that outputs information about the policy management apparatus 100, to the outside. For example, the output apparatus 16 may be a display apparatus that is configured to display information about the policy management apparatus 100.

Figure 4:
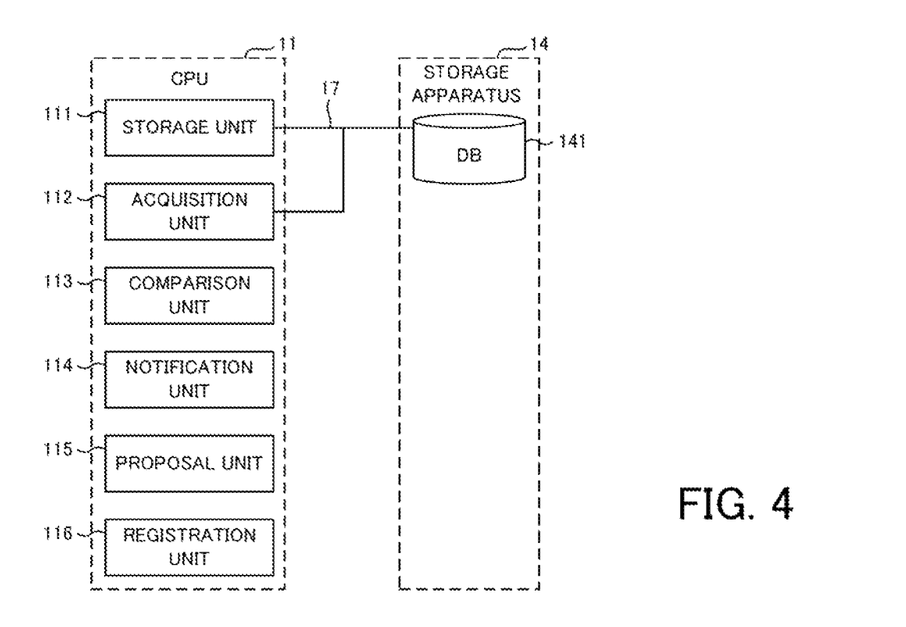
FIG. 4 is a block diagram illustrating a functional block implemented in a CPU of the policy management apparatus according to the first example embodiment.

Next, a configuration of the functional block implemented in the CPU 11 will be described with reference to FIG. 4. FIG. 4 is a block diagram illustrating the functional block implemented in the CPU 11.

As illustrated in FIG. 4, a storage unit 111, an acquisition unit 112, a comparison unit 113, a notification unit 114, and a proposal unit 115 are implemented in the CPU 11 as the logical functional block.

The storage unit 111 obtains, from the data provider, the policy information associated with the data provided by the data provide to the PDS 20, and stores the obtained policy information, for example, in the database 141 implemented in the storage apparatus 14.

The acquisition unit 112, the comparison unit 113, the notification unit 114 and the registration unit 116 will be described with reference to a flowchart in FIG. 5. The operation illustrated in the flowchart of FIG. 5 is an operation for verifying whether or not the data is provided from the PDS 20 to the data user in accordance with the provision permission policy defined by the policy information.

Figure 5:
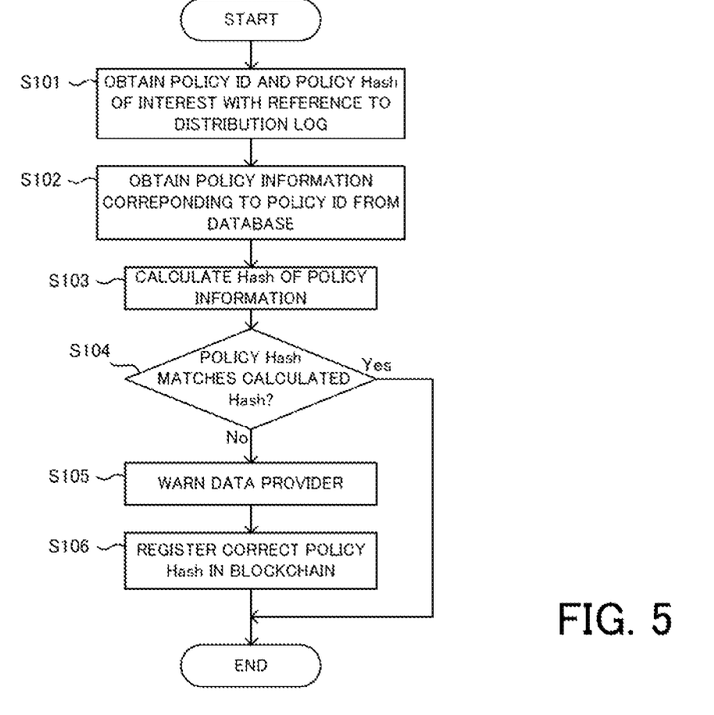
FIG. 5 is a flowchart illustrating the operation of the policy management apparatus according to the first example embodiment.

In FIG. 5, the acquisition unit 112 obtains the policy ID and the policy Hash contained in one distribution log, which is a verification target, among the plurality of distribution logs registered in the blockchain (step S101). Then, the acquisition unit 112 obtains the policy information corresponding to the policy ID obtained in the step S101 from the database 141 (step S102).

Then, the comparison unit 113 calculates the hash value of the policy information from the policy information obtained in the step S102 by using a predetermined hash function (step S103). Then, the comparison unit 113 compares the policy Hash obtained in the step S101 with the hash value calculated in the step S103 to determine whether or not the two values match (step S104).

In the step S104, when it is determined that the two values match (the step S104: Yes), the operation is ended. It is because, in this case, the data is provided from the PDS 20 to the data user on the basis of the correct policy information (in other words, in accordance with the provision permission policy). In this case, the notification unit 114 may notify the data provider that the data is provided on the basis of the correct policy information, for example.

On the other hand, in the step S104, when it is determined that the two values do not match (the step S104: No), the notification unit 114 notifies the data provider (step S105). It is because, in this case, the data is provided from the PDS 20 to the data user on the basis of a policy that is different from the provision permission policy intended by the data provider (i.e., the provision permission policy defined by the policy information stored in the database 141 of the policy management service 10). The notification to the data provider may be made immediately after it is determined that the two values do not match in the step S104, or may be made at a predetermined timing. Furthermore, when it is determined a plurality of times in a relatively short period that the two values do not match, a plurality of determination results may be notified collectively. Regarding aspects of the notification, various existing aspects may be applied, such as, for example, a warning.

In this case, furthermore, the registration unit 116 registers a revocation information (corresponding to the distribution log) containing the policy ID of the policy information obtained in the step S102 (that is, the correct policy information) and the hash value calculated in the step S103, in the blockchain (step S106).

Here, an explanation will be given to an operation when the data user receives the data from the PDS 20 in the data distribution system 1. When the data user requests the data provision to the PDS 20, the data management apparatus 200 of the PDS 20 refers to the policy information stored in the database 241 and determines whether or not to permit the data provision. When it is determined that the data provision is to be permitted, the data management apparatus 200 issues a token that indicates the data provision permission, to the data user. The token may be sent directly to the data user, or may be registered, for example, in the blockchain (in this case, the data user obtains the token from the blockchain).

Incidentally, the token contains the policy ID, etc. of the policy information used for the determination of the data provision permission. Subsequently, the data management apparatus 200 provides the data to the data user on condition that the data management apparatus 200 receives the token that indicates the data provision permission, from the data user.

In the data distribution system 1 configured as described above, when transmitting the token to the data management apparatus 200, the data user's terminal (not illustrated) firstly confirms whether or not the revocation information related to the step S106 (that is, information containing the policy ID and the hash value of the correct policy information) is registered in the blockchain. If the revocation information containing the policy ID corresponding to the policy ID contained in the token is registered in the blockchain, the data user's terminal revokes the token. As a result, the provision to the data user of the data associated with the policy information corresponding to the policy ID contained in the revoked token is stopped.

Therefore, by performing the step S106 when it is determined in the step S104 that the two values do not match (the step S104: No), it is possible to prevent that the use of an inappropriate policy information in the PDS 20 is continued.

Returning to FIG. 4, the proposal unit 115 proposes a new provision permission policy for the data to the data provider on the basis of one or a plurality of policy information stored in the database 141. Specifically, the proposal unit 115 obtains statistics related to the degree of provision on the basis of one or a plurality of policy information, for example, for each item (an item related to specific data, such as age, address, family structure, height, and body weight, the purpose of use of the data, the period of the data provision, destination of the provision, etc.), and makes a proposal to the data provider, such as "it is better not to provide the data" or "the data is often provided" for a certain item, on the basis of the statistics.

(Audit Apparatus)

Figure 6:
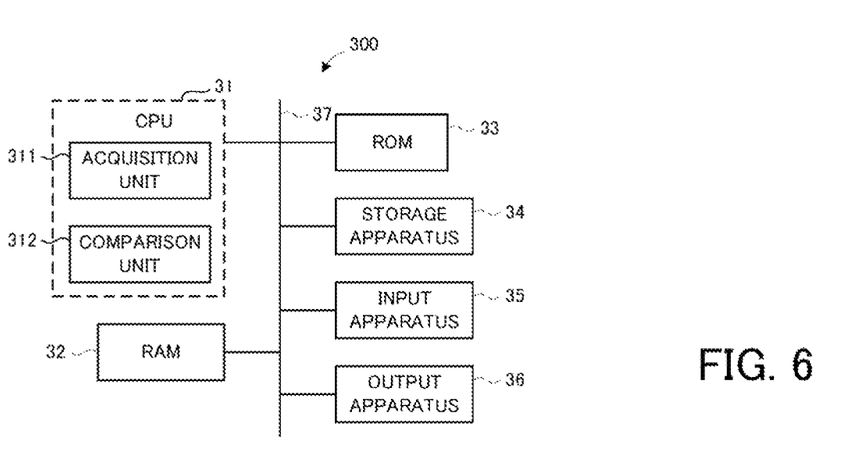
FIG. 6 is a block diagram illustrating a functional block implemented in a CPU of an audit apparatus according to the first example embodiment.

A hardware configuration of the audit apparatus 300 of the audit organization 30 will be described with reference to FIG. 6. FIG. 6 is a block diagram illustrating the hardware configuration of the audit apparatus 300 according to the first example embodiment. When a plurality of audit apparatuses 300 are installed in the audit organization 30, all the audit apparatuses 300 may have the hardware configuration illustrated in FIG. 6.

In FIG. 6, the audit apparatus 300 includes a CPU 31, a RAM 32, a ROM 33, a storage apparatus 34, an input apparatus 35, and an output apparatus 36. The CPU 31, the RAM 32, the ROM 33, the storage apparatus 34, the input apparatus 35, and the output apparatus 36 are interconnected through a data bus 37.

The CPU 31 reads a computer program. The CPU 31 controls the RAM 32, the storage apparatus 34, the input apparatus 35, and the output apparatus 36 by executing the read computer program. Especially in the first example embodiment, when the CPU 31 executes the read computer program, a logical functional block(s) for verifying whether or not the data is provided from the PDS 20 to the data user in accordance with the provision permission policy defined by the policy information is implemented in the CPU 31. In other words, the CPU 31 is configured to function as a controller for performing the above-described verification.

As illustrated in FIG. 3, an acquisition unit 311 and a comparison unit 312 are implemented in the CPU 31 as the logical functional block. The acquisition unit 311 and the comparison unit 312 respectively have the same functions as those of the acquisition unit 112 and the comparison unit 113 described above. That is, the acquisition unit 311 and the comparison unit 312 have the functions for verifying whether or not the data is provided from the PDS 20 to the data user in accordance with the provision permission policy defined by the policy information.

That is, the acquisition unit 311 firstly obtains the policy ID and the policy Hash contained in one distribution log, which is the verification target, among the plurality of distribution logs registered in the blockchain. Then, the acquisition unit 311 obtains the policy information corresponding to the obtained policy ID, from the database 141 of the policy management service 10.

Then, the comparison unit 312 calculates the hash value of the policy information from the policy information obtained from the database 141 by using a predetermined hash function. Next, the comparison unit 312 compares the policy Hash obtained from the one distribution log with the calculated hash value to determine whether or not the two value match.

The comparison unit 312 outputs a determination result via the output apparatus 36. At this time, the comparison unit 312 may output the determination result via the output apparatus 36 only when it is determined that the two value do not match.

Incidentally, the "policy management service 10" and the "PDS 20" respectively correspond to examples of "one operating entity" and "another operating entity" in Supplementary Note described later. The "storage apparatus 14", the "acquisition unit 112", the "comparison unit 113", the "notification unit 114", the "proposal unit 115", and the "registration unit 116" respectively correspond to examples of the "storage unit", the "acquisition unit", the "comparison unit", the "notification unit", the "proposal unit", and the "registration unit" in Supplementary Note described later. The "acquisition unit 311" and the "comparison unit 312" respectively correspond to other examples of the "acquisition unit" and the "comparison unit" in Supplementary Note described later.

(Technical Effects)

When original data is different, the obtained hash values are also different. For this reason, the hash value is very effective for the detection of data changes or interpolation. In the data distribution system 1 according to the first example embodiment described above, the property of the hash value is used to verify the policy information applied when the data is provided from the PDS 20 to the data user.

Then, when the policy Hash contained in the distribution log matches the hash value calculated from the corresponding policy information stored in the database 141 of the policy management service 10, it is possible to confirm that the data is provided from the PDS 20 to the data user in accordance with the correct policy information. On the other hand, when the policy Hash and the calculated hash value do not match, it is possible to confirm that the data is provided from the PDS 20 to the data user in accordance with the inappropriate policy information. In other words, according to the data distribution system 1, it is possible to verify whether or not the data is provided from the PDS 20 to the data user in accordance with the provision permission policy defined by the policy information.

Especially in the first example embodiment, the data distribution system 1 includes the policy management service 10 that manages the policy information, separately from the PDS 20. For this reason, in the data distribution system 1, it is possible to verify whether or not the data is provided from the PDS 20 in accordance with the provision permission policy defined by the policy information, independently of the PDS 20, which is the entity that provides the data to the data user. Therefore, in the data distribution system 1, it is possible to fairly verify whether or not the data is provided from the PDS 20 in accordance with the provision permission policy defined by the policy information. Therefore, in the data distribution system 1, even when the PDS 20 provides the data intendedly (e.g., maliciously or intentionally) against the policy information, it is possible to appropriately identify that the data is provided from the PDS 20 to the data user against the policy information. Therefore, the data distribution system 1 in the first example embodiment is particularly advantageous in situations where a trust relationship between the data provider and the PDS 20 may collapse, which is originally assumed not to collapse.

Incidentally, by referring to the distribution log and comparing the specific content of the provision permission policy defined by the policy information with the specific content of the data provided to the data user, it is also possible to verify whether or not the data is provided from the PDS 20 to the data user in accordance with the provision permission policy defined by the policy information. However, in such a verification method, when the data handled by the data distribution system 1 increases, the time and cost for the verification may also increase and it may be difficult to perform appropriate verification. However, in the configuration in which the policy Hash is compared with the calculated hash value, the verification can be appropriately performed even if the data handled by the data distribution system 1 increases.

By the way, the audit organization 30 may confirm the specific content of the policy information when auditing the PDS 20. On the other hand, for example, when one policy information is changed, the PDS 20 may not store the one policy information before the change. Consequently, even if the audit organization 30 tries to confirm the specific content of the one policy information before the change, it may not be able to obtain the one policy information before the change from the PDS 20. However, in the first example embodiment, the one policy information before the change is stored in the database 141 of the policy management service 10. Therefore, even if the audit organization 30 cannot obtain the one policy information before the change from the PDS 20, the audit organization 30 is allowed to obtain the one policy information before the change from the policy managing service 10. As a result, the audit organization 30 is allowed to confirm the specific content of the one policy information before the change.

Modified Example

Figure 7:
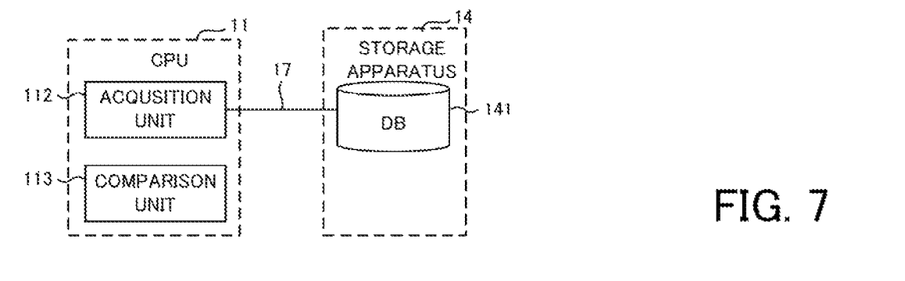
FIG. 7 is a block diagram illustrating a functional block implemented in a CPU of a policy management apparatus according to a modified example of the first example embodiment.

As illustrated in FIG. 7, the acquisition unit 112 and the comparison unit 113 are implemented in the CPU 11 of one policy management apparatus 100 of the policy management service 10, whereas the functional blocks other than the acquisition unit 112 and the comparison unit 113 may not be implemented. When a plurality of policy management apparatuses 100 are installed in the policy management service 10, the database 141 may be implemented in the storage apparatus 14 of another policy management apparatus 100 that is different from the one policy management apparatus 100.

Second Example Embodiment

Figure 8:
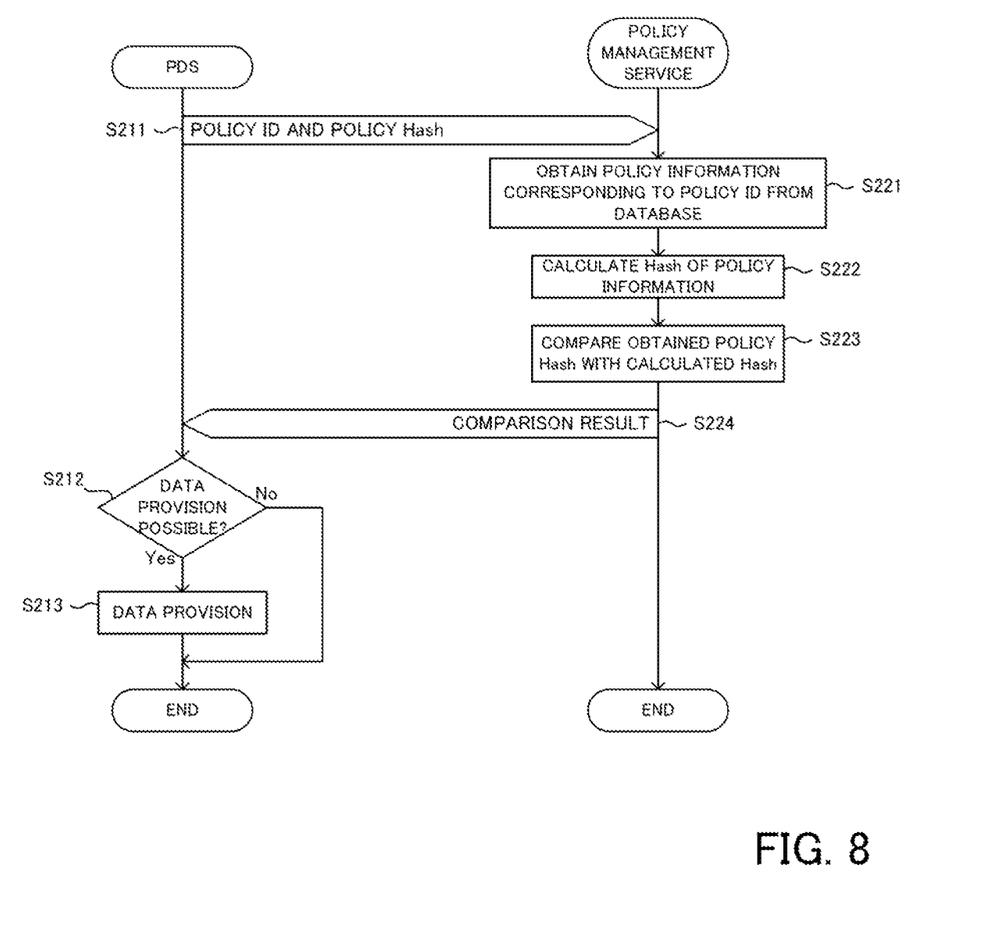
FIG. 8 is a flowchart illustrating the operation of a data distribution system according to a second example embodiment.

The data distribution system 1 according to a second example embodiment will be described with reference to FIG. 8. In the above-described first example embodiment, by referring to the distribution log registered in the blockchain, it is verified whether or not the data is provided from the PDS 20 to the data user in accordance with the provision permission policy defined by the policy information. In contrast, in the second example embodiment, when the data is provided from the PDS 20 to the data user, it is verified whether or not the data is provided in accordance with the provision permission policy defined by the policy information. In the second example embodiment, the description that overlaps with that of the first example embodiment will be omitted, the same parts on the drawings will be denoted by the same reference numerals, and basically, different points will be described with reference to FIG. 8.

When the data user requests data provision, the data management apparatus 200 of the PDS 20 transmits the policy ID and the policy Hash of the policy information associated with the data to be provided in response to the request, to the policy management service 10 (step S211).

The acquisition unit 112 (see FIG. 4) of the policy management apparatus 100 of the policy management service 10 obtains the policy information corresponding to the received policy ID from the database 141 (step S221).

Then, the comparison unit 113 (see FIG. 4) of the policy management apparatus 100 calculates the hash value of the policy information from the policy information obtained from the database 141 by using a predetermined hash function (step S222). Then, the comparison unit 113 compares the policy Hash with the calculated hash value (step S223).

Then, the policy management apparatus 100 transmits a comparison result of the step S233 to the data management apparatus 200 of the PDS 20 (step S224). At this time, when the policy Hash does not match the calculated hash value, the notification unit 114 of the policy management apparatus 100 may notify the data provider, for example, that the policy information that is different from the intention of the data provider is used. The notification to the data provider may be made immediately after it is determined that the policy Hash and the calculated hash value do not match in the step S223, or may be made at a predetermined timing. Furthermore, when it is determined a plurality of times in a relatively short period that the two values do not match, a plurality of determination results may be notified collectively. Regarding aspects of the notification, various existing aspects may be applied, such as, for example, a warning.

When the comparison result indicates that the policy Hash matches the calculated hash value, the data management apparatus 200 determines that the data provision is possible (step S212: Yes), and provides the data user with the data on the basis of the policy information (step S213).

On the other hand, when the comparison result indicates that the policy Hash does not match the calculated hash value, the data management apparatus 200 determines that the data provision is not possible (the step S212: No), and ends the operation. In this case, the data management apparatus 200 may notify the data user that the data cannot be provided.

(Technical Effects)

In the second example embodiment, the policy information to be applied is verified before the data is provided from the PDS 20 to the data user. Therefore, according to the second example embodiment, it is especially possible to prevent that the data is provided to the data user in accordance with the inappropriate policy information.

Third Example Embodiment

The data distribution system 1 according to a third example embodiment will be described. In the third example embodiment, by referring not to the distribution log registered in the blockchain but to the distribution log before being registered in the blockchain, it is verified whether or not the data is provided in accordance with the provision permission policy defined by the policy information when the data is provided from the PDS 20 to the data user. In the third example embodiment, the description that overlaps with that of the first example embodiment will be omitted, the same parts on the drawings will be denoted by the same reference numerals, and basically, different points will be described.

In the third example embodiment, only the policy management apparatus 100 of the policy management service 10 has the right to create a block and to connect the created block to the blockchain. That is, in the third example embodiment, only the policy management apparatus 100 is a miner.

In the third example embodiment, it is assumed that the data is actually provided from the PDS 20 to the data user on condition that the distribution log generated when the data is provided from the PDS 20 to the data user is registered in the blockchain, or on condition that the distribution log is registered in one block and a predetermined number of blocks are then connected after the one block.

The generated distribution log is temporarily stored in a memory pool built in, for example, the storage apparatus 14 (see FIG. 3) of the policy management apparatus 100 before being registered in the blockchain. The acquisition unit 112 (see FIG. 4) of the policy management apparatus 100 obtains the policy information corresponding to the policy ID contained in one distribution log, which is the verification target, in the memory pool, from the database 141.

Then, the comparison unit 113 (see FIG. 4) of the policy management apparatus 100 calculates the hash value of the policy information from the policy information obtained from the database 141 by using a predetermined hash function. Then, the comparison unit 113 compares the policy Hash contained in the one distribution log with the calculated hash value, and determines whether or not the two values match.

When it is determined that the two values match, the policy management apparatus 100 registers the above-described one distribution log in the blockchain. On the other hand, when it is determined that the two values do not match, the policy management apparatus 100 excludes the one distribution log, for example, so that the one distribution log is not registered in the blockchain. In this case, the notification unit 114 (see FIG. 4) of the policy management apparatus 100 issues a warning to the data provider.

(Technical Effects)

Even in the third example embodiment, as in the second example embodiment, the policy information to be applied is verified before the data is provided from the PDS 20 to the data user. Therefore, according to the third example embodiment, it is especially possible to prevent that the data is provided to the data user in accordance with the inappropriate policy information.

<Supplementary Note>

With respect to the example embodiments described above, the following Supplementary Notes will be further disclosed.

(Supplementary Note 1)

A management apparatus described in Supplementary Note 1 is a management apparatus operated by one operating entity, the management apparatus including: a storage unit that stores a policy information, which is associated with data provided by a data provider to another operating entity that is different from the one operating entity, and which defines a provision permission policy of the data provider for the data; an acquisition unit that refers to a log information in which a first hash value of one policy information is recorded and that obtains a policy information corresponding to the one policy information from the storage unit, the one policy information being associated with one data provided to a data user from the another operating entity; and a comparison unit that calculates a second hash value of the obtained policy information and that compares it with the first hash value.

(Supplementary Note 2)

A management apparatus described in Supplementary Note 2 is the management apparatus described in Supplementary Note 1, including a notification unit that notifies a data provider that provides the one data associated with the one policy information when the second hash value is different from the first hash value.

(Supplementary Note 3)

A management apparatus described in Supplementary Note 3 is the management apparatus described in Supplementary Note 2, wherein the log information is registered in a data management ledger using a distributed ledger technique.

(Supplementary Note 4)

A management apparatus described in Supplementary Note 4 is the management apparatus described in Supplementary Note 3, including a registration unit that registers the second hash value in the data management ledger when the second hash value is different from the first hash value.

(Supplementary Note 5)

A management apparatus described in Supplementary Note 5 is the management apparatus described in Supplementary Note 1, including a proposal unit that proposes a new permission policy to the data provider on the basis of one or a plurality of policy information stored in the storage unit.

(Supplementary Note 6)

A management method described in Supplementary Note 6 is a management method in a management apparatus operated by one operating entity, the management method including: storing a policy information, which is associated with data provided by a data provider to another operating entity that is different from the one operating entity, and which defines a provision permission policy of the data provider for the data, into a storage unit; referring to a log information in which a first hash value of one policy information is recorded and obtaining a policy information corresponding to the one policy information from the storage unit, the one policy information being associated with one data provided to a data user from the another operating entity; and calculating a second hash value of the obtained policy information and comparing it with the first hash value.

(Supplementary Note 7)

A management apparatus described in Supplementary Note 7 is a management apparatus operated by one operating entity, the management apparatus including: a storage unit that stores a policy information, which is associated with data provided by a data provider to another operating entity that is different from the one operating entity, and which defines a provision permission policy of the data provider for the data; an acquisition unit that refers to an identification information that indicates one policy information associated with one data provided to the data user from the another operating entity, and that obtains a policy information corresponding to the one policy information from the storage unit; and a comparison unit that compares a second hash value calculated from the obtained policy information with a first hash value of the one policy information obtained from the another operating entity.

(Supplementary Note 8)

A verification apparatus described in Supplementary Note 8 is a verification apparatus including: an acquisition unit that refers to a log information in which a first hash value of one policy information is recorded and that obtains a policy information corresponding to the one policy information, the one policy information being associated with one data provided to a data user, the one policy information defining a provision permission policy for the one data of a data provider that provides the one data; and a comparison unit that calculates a second hash value of the obtained policy information and that compares it with the first hash value.

(Supplementary Note 9)

A verification apparatus described in Supplementary Note 9 is the verification apparatus described in Supplementary Note 8, wherein the acquisition unit obtains the corresponding policy information from a management apparatus operated by an operating entity that is different from an operating entity that provides the one data to the data user.

(Supplementary Note 10)

A computer program described in Supplementary Note 10 is a computer program that allows a computer to execute the management method described in Supplementary Note 6.

(Supplementary Note 11)

A recording medium described in Supplementary Note 11 is a recording medium on which the computer program described in Supplementary Note 10 is recorded.

The present invention is not limited to the above-described examples and is allowed to be changed, if desired, without departing from the essence or spirit of the invention which can be read from the claims and the entire specification. A management apparatus, a management method, a verification apparatus, a computer program and a recording medium, which involve such changes, are also intended to be within the technical scope of the present invention.

DESCRIPTION OF REFERENCE CODES

1 ... Data distribution systems, 10 ... Policy management service, 11, 31 ... CPU, 12, 32 ... RAM, 13, 33 ... ROM, 14, 34 ... Storage apparatus, 15, 35 ... Input apparatus, 16, 36 ... Output apparatus, 20 ... PDS, 30 ... Audit organization, 100 ... Policy management apparatus, 111 ... Storage unit, 112, 311 ... Acquisition unit, 113, 312 ... Comparison unit, 114 ... Notification unit, 115 ... Proposal unit, 116 ... Registration unit, 141, 241 ... Database, 200 ... Data management apparatus, 300 ... Audit apparatus

What is claimed is:

1. A management apparatus operated by a first operating entity, the management apparatus comprising:
a storage a storing second policy information associated with data provided by a data provider to a second operating entity different from the first operating entity, the second policy information defining a provision permission policy of the data provider for the data;
a processor;
a memory storing instructions executable by the processor to:
acquire, from a blockchain, log information in which a first hash value of first policy information is recorded, the first policy information associated with data provided by the second operating entity to a data user;

acquire, from the storage, the second policy information stored in the storage;

calculate a second hash value of the second policy information stored in the storage as acquired from the storage;

compare the second hash value as has been calculated with the first hash value recorded in the log information; and when a comparison result indicates that the second hash value differs from the first hash value, record, in the blockchain, the second hash value of the second policy information stored in the storage to indicate that the second policy information is correct, and revocation information referencing the policy information having the first hash value recorded in the log information to indicate that the first policy information is incorrect.

2. The management apparatus according to claim 1, wherein the instructions are executable by the processor to further notify the data provider when the second hash value differs from the first hash value.

3. The management apparatus according to claim 1, wherein the instructions are executable by the processor to further propose a new permission policy to the data provider based on the second policy information stored in the storage.

4. A management method performed by a management apparatus operated by a first operating entity, the management method comprising:

storing, in a storage, second policy information associated with data provided by a data provider to a second operating entity different from the first operating entity, the second policy information defining a provision permission policy of the data provider for the data;

acquiring, from a blockchain, log information in which a first hash value of first policy information is recorded, the first policy information associated with data provided by the second operating entity to a data user;

acquiring, from the storage, the second policy information stored in the storage;

calculating a second hash value of the second policy information stored in the storage as acquired from the storage;

comparing the second hash value as has been calculated with the first hash value recorded in the log information; and when a comparison result indicates that the second hash value differs from the first hash value, recording, in the blockchain, the second hash value of the second policy information stored in the storage to indicate that the second policy information is correct, and revocation information referencing the policy information having the first hash value recorded in the log information to indicate that the first policy information is incorrect.

5. A non-transitory recording medium storing a computer program executable by a management apparatus operated by a first operating entity to perform a management method comprising:

storing, in a storage, second policy information associated with data provided by a data provider to a second operating entity different from the first operating entity, the second policy information defining a provision permission policy of the data provider for the data;

acquiring, from a blockchain, log information in which a first hash value of first policy information is recorded, the first policy information associated with data provided by the second operating entity to a data user;

acquiring, from the storage, the second policy information stored in the storage;

calculating a second hash value of the second policy information stored in the storage as acquired from the storage;

comparing the second hash value as has been calculated with the first hash value recorded in the log information; and when a comparison result indicates that the second hash value differs from the first hash value, recording, in the blockchain, the second hash value of the second policy information stored in the storage to indicate that the second policy information is correct, and revocation information referencing the policy information having the first hash value recorded in the log information to indicate that the first policy information is incorrect.

* * * * *